(12) United States Patent
Shimizu

(10) Patent No.: US 10,911,660 B2
(45) Date of Patent: Feb. 2, 2021

(54) CONTROL APPARATUS, IMAGING APPARATUS, CONTROL METHOD, AND STORAGE MEDIUM

(71) Applicant: CANON KABUSHIKI KAISHA, Tokyo (JP)

(72) Inventor: Yusuke Shimizu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/434,590

(22) Filed: Jun. 7, 2019

(65) Prior Publication Data

US 2019/0394406 A1    Dec. 26, 2019

(30) Foreign Application Priority Data

Jun. 20, 2018 (JP) ................................. 2018-117237

(51) Int. Cl.
```
H04N 5/232    (2006.01)
G02B 7/28     (2006.01)
G02B 7/36     (2006.01)
G03B 13/36    (2006.01)
```
(52) U.S. Cl.
CPC ....... *H04N 5/232122* (2018.08); *G02B 7/282* (2013.01); *G02B 7/285* (2013.01); *G02B 7/365* (2013.01); *G03B 13/36* (2013.01)

(58) Field of Classification Search
CPC .. H04N 5/232122; G03B 13/36; G02B 7/285; G02B 7/365; G02B 7/282; G02B 7/36; G02B 7/34
See application file for complete search history.

(56) References Cited

U.S. PATENT DOCUMENTS

2009/0303378 A1    12/2009  Yoshimatsu et al.
2010/0157095 A1*    6/2010  Karn ................. H04N 1/00137
                                                      348/231.1
2012/0169917 A1*    7/2012  Isobe ................ H04N 5/23212
                                                      348/345

FOREIGN PATENT DOCUMENTS

JP    2009294416 A    12/2009
JP    2016114614 A     6/2016

* cited by examiner

*Primary Examiner* — Yogesh K Aggarwal
(74) *Attorney, Agent, or Firm* — Rossi, Kimms & McDowell LLP

(57) ABSTRACT

A control apparatus includes a calculation unit configured to perform a focus detection by a phase difference detection method based on an image signal output from an image sensor, and to calculate a defocus amount, and a focus control unit configured to control a focus lens based on the defocus amount. When a predetermined condition is satisfied, the focus control unit changes a driving speed of the focus lens based on information on a luminance or contrast of the image signal. At least one processor or circuit is configured to perform a function of at least one of the units.

12 Claims, 11 Drawing Sheets

PIXEL CONFIGURATION INCOMPATIBLE WITH IMAGING SURFACE PHASE DIFFERENCE METHOD

| R | Gr | R | Gr | R | Gr | R | Gr |
|---|----|---|----|---|----|---|----|
| Gb | B | Gb | B | Gb | B | Gb | B |

FIG. 2A

PIXEL CONFIGURATION COMPATIBLE WITH IMAGING SURFACE PHASE DIFFERENCE METHOD

| R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B |

FIG. 2B

CONTROL APPARATUS, IMAGING APPARATUS, CONTROL METHOD, AND STORAGE MEDIUM

BACKGROUND OF THE INVENTION

Field of the Invention

The present invention relates to an imaging apparatus that provides a focus control by a phase difference detection method.

Description of the Related Art

One conventionally known imaging apparatus performs a focus detection by a phase difference detection method (imaging surface phase difference detection method) using an output signal from an image sensor. The phase difference detection method including the imaging surface phase difference detection method provides a control so as to drive a lens at a high speed in an autofocus (AF) control and to shorten the focusing time. In capturing a thin line or low contrast object in the low luminance state, such as a night scene or indoors, the obtained image signal is so weak and the lens speed is so high that when the lens is moved to a lens position distant from the in-focus point for focusing, it goes over the in-focus point and the focusing may fail.

Japanese Patent Laid-Open No. ("JP") 2016-114614 discloses an autofocus apparatus that changes the lens speed based on a focus shift amount of each method in the focus detection using both the phase difference detection method and the contrast detection method.

However, JP 2016-114614 has a difficulty in performing a high precision focus control in capturing the thin line or low contrast object in the low luminance state.

SUMMARY OF THE INVENTION

The present invention provides a control apparatus, an imaging apparatus, a control method, and a storage medium, each of which can provide a fast and accurate focus control in capturing a specific object under a predetermined condition.

A control apparatus according to one aspect of the present invention includes a calculation unit configured to perform a focus detection by a phase difference detection method based on an image signal output from an image sensor, and to calculate a defocus amount, and a focus control unit configured to control a focus lens based on the defocus amount. When a predetermined condition is satisfied, the focus control unit changes a driving speed of the focus lens based on information on a luminance or contrast of the image signal. At least one processor or circuit is configured to perform a function of at least one of the units.

An imaging apparatus according to another aspect of the present invention includes the above control apparatus, and an image sensor configured to photoelectrically converting an optical image formed through an imaging optical system.

A control method according to another aspect of the present invention includes the steps of performing a focus detection by a phase difference detection method based on an image signal output from an image sensor, and calculating a defocus amount, and controlling a focus lens based on the defocus amount. When a predetermined condition is satisfied, the controlling step changes a driving speed of the focus lens based on information on a luminance or contrast of the image signal. A non-transitory computer-readable storage medium according to another aspect of the present invention stores a program for causing a computer to execute the above control method.

Further features of the present invention will become apparent from the following description of exemplary embodiments with reference to the attached drawings.

BRIEF DESCRIPTION OF THE DRAWINGS

FIG. 2A illustrates an illustrative pixel configuration of the non-imaging surface phase difference method.

FIG. 2B illustrates an illustrative pixel configuration of an imaging surface phase difference method.

DESCRIPTION OF THE EMBODIMENTS

Referring now to the accompanying drawings, a detailed description will be given of embodiments according to the present invention.

Figure 1:
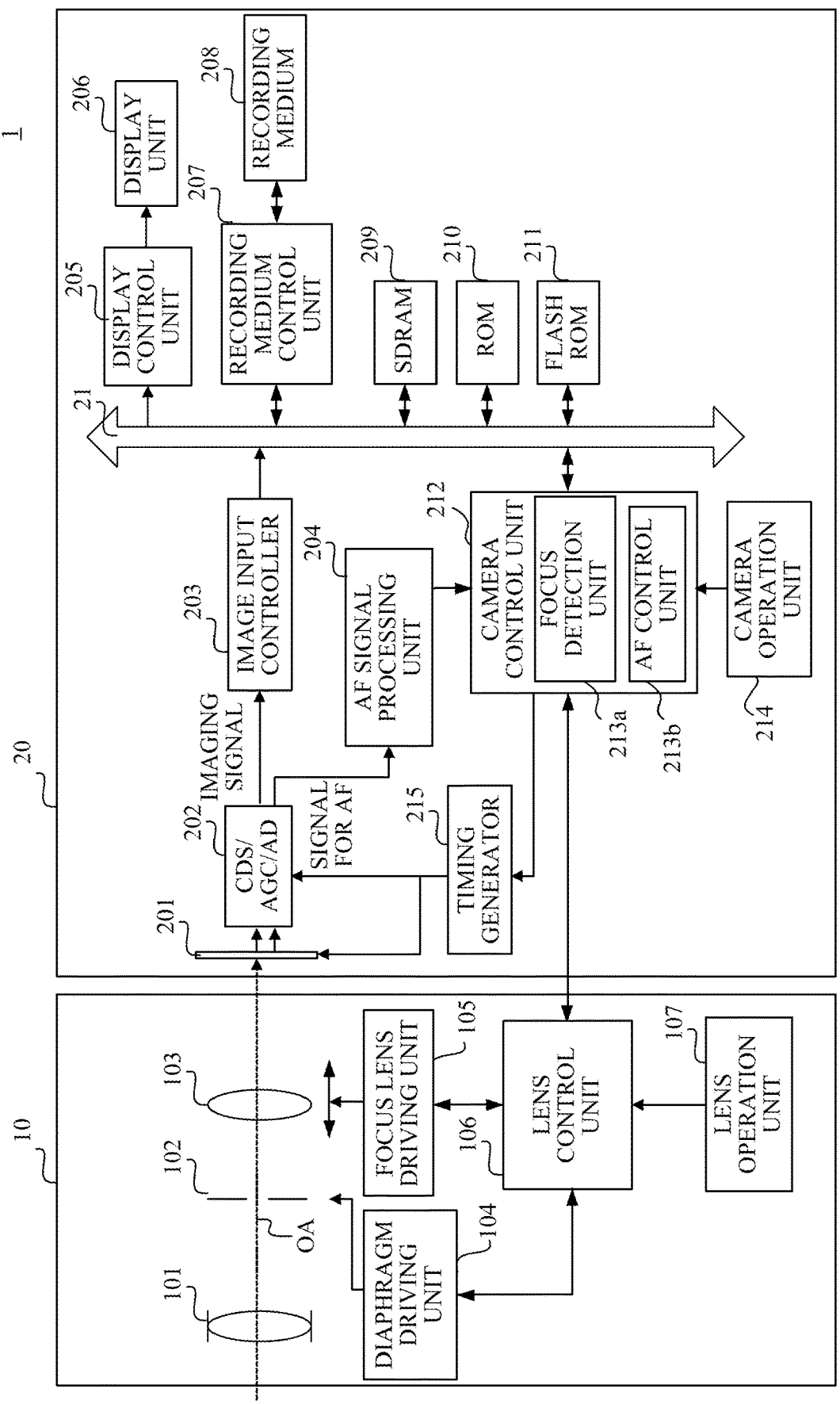
FIG. 1 is a block diagram of an imaging apparatus according to this embodiment.

Referring now to FIG. 1, a description will be given of an imaging apparatus according to this embodiment. FIG. 1 is a block diagram of an imaging apparatus 1 (a lens interchangeable camera system) according to this embodiment. As illustrated in FIG. 1, the imaging apparatus 1 includes an interchangeable lens 10 (lens apparatus) and a camera body 20 (imaging apparatus body). A lens control unit 106 that integrally controls the entire operation of the interchangeable lens 10 and a camera control unit 212 that integrally controls the entire operation of the camera body 20 communicate information with each other.

A description will be given of the configuration of the interchangeable lens 10. The interchangeable lens 10 includes a fixed lens 101, a diaphragm (aperture stop) 102, a focus lens 103, a diaphragm driving unit 104, a focus lens driving unit 105, a lens control unit 106, and a lens operation unit 107. The fixed lens 101, the diaphragm 102, and the focus lens 103 constitute an imaging (or image capturing) optical system. The diaphragm 102 is driven by the diaphragm driving unit 104, and controls a light amount incident on the image sensor 201 described later. The focus lens 103 is driven in a direction (optical axis direction) along an optical axis OA by the focus lens driving unit 105, and adjusts a focus (focus control) formed on the image sensor 201 described later. The diaphragm driving unit 104 and the focus lens driving unit 105 are controlled by the lens control unit 106 to determine the aperture amount of the diaphragm unit 106 and the position of the focus lens 103 in the optical axis direction. The lens operation unit 107 is operated by the user. When the lens operation unit 107 is operated by the user, the lens control unit 106 provides a control according to the operation of the user. The lens control unit 106 controls the diaphragm driving unit 104 and the focus lens driving unit 105 according to a control command and control information received from a camera control unit 212 described later, and transmits lens control information to the camera control unit 212.

Next follows a description of the configuration of the camera body 20. The camera body 20 can obtain an imaging signal (image data) from a light flux that has passed through an imaging optical system in the interchangeable lens 10. The camera body 20 includes a bus 21, an image sensor 201, a CDS (correlation double sampling)/AGC (auto gain control)/AD (analog-to-digital) converter 202, an image input controller 203, an AF signal processing unit 204, a display control unit 205, and a display unit 206. The camera body 20 further includes a recording medium control unit 207, a recording medium 208, an SDRAM 209, a ROM 210, a flash ROM 211, a camera control unit 212, an AF control unit 213b, a camera operation unit 214, and a timing generator 215.

The image sensor 201 includes a CCD sensor, a CMOS sensor, etc., forms an object image (optical image) formed through an imaging optical system on a light receiving surface, and converts it into a signal charge corresponding to the incident light amount through a photodiode (photoelectrically convert the object image). The signal charge stored in each photodiode is sequentially read out of the image sensor 201 as a voltage signal corresponding to the signal charge based on a driving pulse supplied from the timing generator 215 in accordance with an instruction from the camera control unit 212.

A description will now be given of the pixel configuration of the image sensor 201 with reference to FIGS. 2A and 2B. FIG. 2A schematically illustrates a pixel configuration example that is not compatible with the imaging surface phase difference AF method, and FIG. 2B schematically illustrates a pixel configuration example that is compatible with the imaging surface phase difference AF method. Each of the pixel configurations illustrated in FIGS. 2A and 2B uses the Bayer array, R denotes a red color filter, B denotes a blue color filter, and Gr and Gb denote a green color filter. The pixel configuration in FIG. 2B compatible with the imaging surface phase difference AF includes two photodiodes A and B divided into two in the horizontal direction of FIG. 2B within one pixel (pixel shown by a solid line) in the pixel configuration incompatible with the imaging surface phase difference AF method illustrated in FIG. 2A. The photodiodes A and B (a first photoelectric conversion unit, a second photoelectric conversion unit) receive light fluxes that have passed through mutually different pupil areas in the imaging optical system. Thus, since the photodiodes A and B receive the light fluxes that have passed through the different exit pupil areas in the imaging optical system, a B image signal has a parallax to an A image signal. One image signal (A or B image signal) of a pair of parallax image signals also has a parallax to the above imaging signal (A+B image signal). The pixel division method illustrated in FIG. 2B is illustrative, and other configurations may be employed such as a vertically dividing configuration in FIG. 2B or a (totally quadrisection) configuration of dividing into two each in the horizontal direction and the vertical direction. The same image sensor may include a plurality of types of pixels divided by different division methods.

The image sensor 201 includes the two photodiodes A and B (a plurality of photoelectric conversion units) in a single pixel as illustrated in FIG. 2B for the imaging plane phase difference AF. The image sensor 201 has a plurality of photoelectric conversion units for a single micro lens (not shown), and the micro lenses are two-dimensionally arrayed. In such a configuration, the image sensor 201 separates the light flux from the imaging optical system with a micro lens (not shown) and forms an image with the two photodiodes A and B, thereby obtaining the two signals or an imaging signal and a focus detection signal. The imaging signal is a signal (A+B image signal) obtained by adding the signals of the two photodiodes A and B to each other. On the other hand, each of the signals from the photodiodes A and B (two image signals of the A and B image signals) serves as a focus detection signal (signal for the imaging surface phase difference AF). The AF signal processing unit 204 calculates a correlation between the two image signals based on the focus detection signal, and obtains information on an image shift amount and various types of reliabilities. This embodiment illustrates a configuration that arranges a plurality of photoelectric conversion units for a single micro lens and the pupil-divided light fluxes enter the respective photoelectric conversion units, but the present invention is not limited to this embodiment. For example, the configuration of the focus detection pixels may have one photodiode under each micro lens and the pupil division may be performed by shielding one of the left and right sides or one of the upper and lower sides by the light shielding layer. Alternatively, a pair of focus detection pixels may be discretely arranged in the array of a plurality of imaging pixels, and a pair of image signals may be acquired from the pair of focus detection pixels.

The imaging signal and the focus detection signal read out of the image sensor 201 are input to the CDS/AGC/AD converter 202, and receive correlated double sampling for removing a reset noise, a gain control, and a signal digitalization. The CDS/AGC/AD converter 202 outputs the imaging signal to the image input controller 203 and the focus detection signal (signal for the AF) to the AF signal processing unit 204.

The image input controller 203 stores as the image data the imaging signal output from the CDS/AGC/AD converter 202 in the SDRAM 209. The image data stored in the SDRAM 209 is displayed on the display unit 206 by the display control unit 205 via the bus 21. In a mode for recording the imaging signal (image data), the recording medium control unit 207 records image data on the recording medium 208. The ROM 210 connected via the bus 21 stores a control program executed by the camera control unit 212 and various data required for the control. The flash ROM 211 stores various setting information relating to the operation of the camera body 20 such as user setting information.

The AF signal processing unit 204 acquires an image signal corresponding to an output signal from the image sensor 201 or an AF signal output from the CDS/AGC/AD converter 202 (a first signal (A image signal) and a second signal (B image signal) as a pair of image signals). The AF signal processing unit 204 calculates the image shift amount through a correlation calculation based on the AF signal. The AF signal processing unit 204 obtains the reliability information of the AF signal (such as a two-image coincidence degree, two-image steepness, contrast information, saturation information, and flaw information). The image shift amount and reliability information (such as the reliability and reliability evaluation value) calculated by the AF signal processing unit 204 are output to the camera control unit 212 (AF control unit 213b).

The camera control unit (control apparatus) 212 notifies the AF signal processing unit 204 of a setting change for calculating the image shift amount and the reliability information based on the image shift amount and the reliability information acquired from the AF signal processing unit 204. For example, for a lame image shift amount, the setting is made so as to widen the area for the correlation calculation, or the type of bandpass filter is changed according to the contrast information. The camera control unit 212 (AF control unit 213b) calculates a plurality of defocus amounts based on the image shift amount acquired from the AF signal processing unit 204. The camera control unit 212 detects an object having a periodic pattern.

According to this embodiment, the camera control unit 212 includes a focus detection unit (calculation unit) 213a and an AF control unit (focus control unit) 213b. The focus detection unit 213a performs a focus detection by a phase difference detection method based on an image signal (a pair of image signals corresponding to light fluxes passing through different pupil areas in the imaging optical system) output from the image sensor 201, and calculate the defocus amount. The AF control unit 213b controls the focus lens 103 based on the defocus amount. The AF control unit 213b changes a driving speed of the focus lens 103 based on the information on the luminance or contrast of the image signal. According to this embodiment, the AF signal processing unit 204 may execute at least part of the functions of the focus detection unit 213a. In this case, the camera control unit 212 and the AF signal processing unit 204 constitute a control apparatus.

This embodiment obtains totally three signals, i.e., an imaging signal (A+B image signal) and a focus detection signal (AF signal or the A image signal and the B image signal) out of the image sensor 201 but the present invention is not limited to this embodiment. Taking into consideration the load of the image sensor 201, for example, totally two signals, i.e., the imaging signal (A+B image signal) and one of two focus detection signals (A image signal) may be obtained, and a difference between the imaging signal and the focus detection signal may be calculated to generate the other focus detection signal (B image signal).

The camera control unit 212 provides controls by exchanging information with all components in the camera body 20. The camera control unit 212 executes various camera functions operated by the user, such as processing in the camera body 20, powering on and off, changing the setting, starting recording, starting controlling the AF in accordance with the input signal from the camera operation unit 214, and confirming a recorded image. As described above, the camera control unit 212 communicates information with the lens control unit 106 in the interchangeable lens 10, sends the control instruction and control information of the interchangeable lens 10, and acquires information from the interchangeable lens 10. The AF control unit 213b provided in the camera control unit 212 is a characteristic part of this embodiment, and controls focusing on the object.

Figure 5:
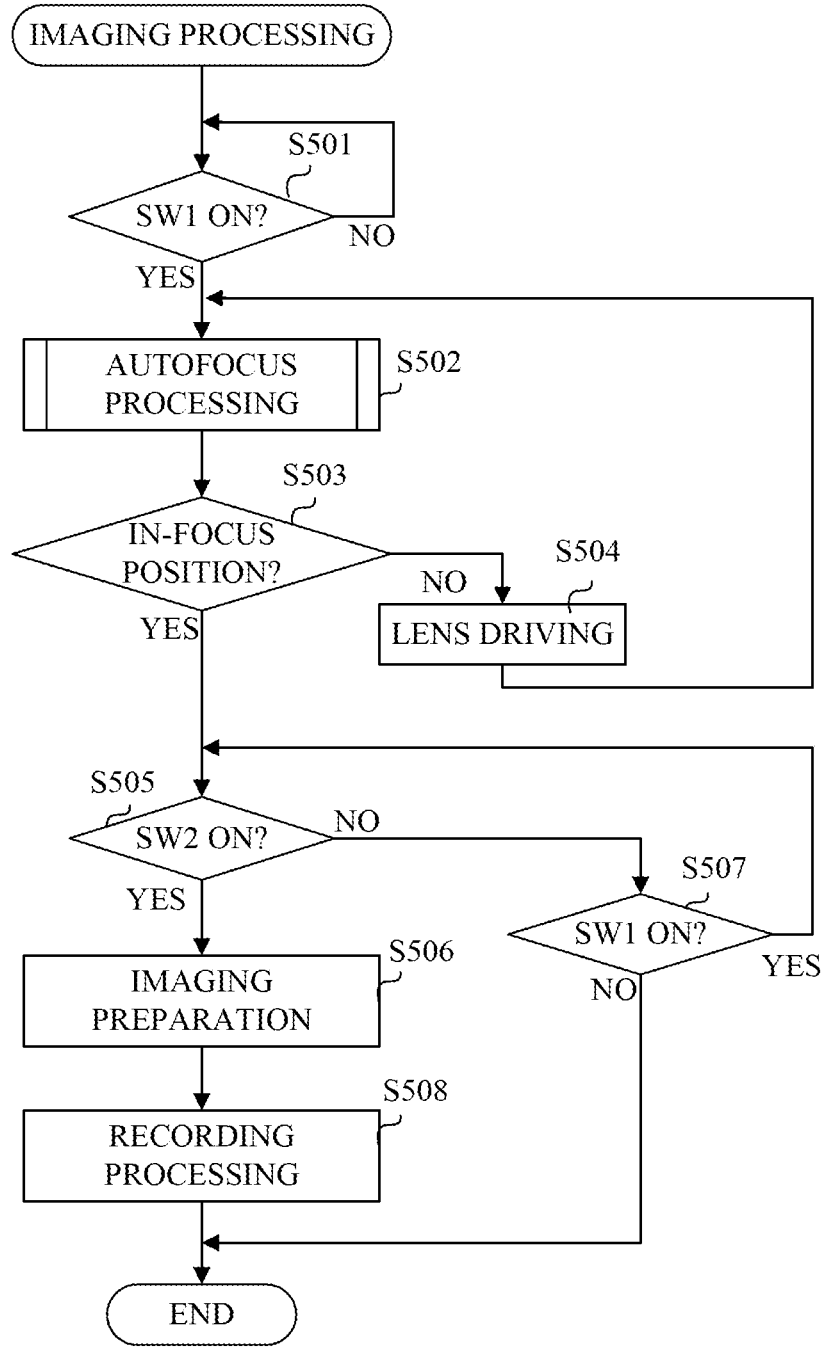
FIG. 5 is a flowchart of imaging processing according to this embodiment.

Referring now to FIG. 5, a description will be given of imaging processing according to this embodiment. FIG. 5 is a flowchart of the imaging processing. Each step in FIG. 5 is mainly executed by the camera control unit 212 or performed by each component, such as the AF signal processing unit 204, based on an instruction from the camera control unit 212.

Initially, in the step S501, the camera control unit 212 determines whether a first switch (SW1) for image capturing has an ON state. If the SW1 has the OFF state, the flow transfers to a standby state and repeats the determination in the step S501. On the other hand, when the SW1 has the ON state, the flow proceeds to the step S502. In the step S502, the AF control unit 213b and the AF signal processing unit 204 perform an autofocus processing (automatic focus detection processing). Details of the autofocus processing will be described later.

Next, in the step S503, the AF control unit 213b acquires focus detection information, and determines whether or not the focus detection result calculated in the step S502 is shows the in-focus position or whether the focus detection result is located in the in-focus range. If the focus detection result is located out of the in-focus range, the flow proceeds to the step S504. In the step S504, the AF control unit 213b performs the lens driving. In other words, the AF control unit 213b transmits a driving command of the focus lens 103 to the lens control unit 106. Thus, the AF control unit 213b controls the driving speed of the focus lens 103 (performs the driving control) based on the focus detection result (defocus amount) calculated in the step S502. Details of the driving control will be described later.

On the other hand, when the focus detection result is located within the in-focus range in the step S503, the flow proceeds to the step S505. In the step S505, the camera control unit 212 determines whether the second switch (SW2) for imaging has the ON state. If the SW2 has the OFF state, the flow proceeds to the step S507. In the step S507, the camera control unit 212 determines whether the SW1 has the ON state. If the SW1 has the ON state, the flow returns to the step S505. On the other hand, when the SW1 has the OFF state, this flow (imaging processing) is completed. If it is determined in the step S505 that the SW2 has the ON state, the flow proceeds to the step S506. In the step S506, the camera control unit 212 performs imaging preparation processing. Next, in the step S508, the camera control unit 212 performs recording processing for the captured image data, and ends the imaging processing.

Figure 6:
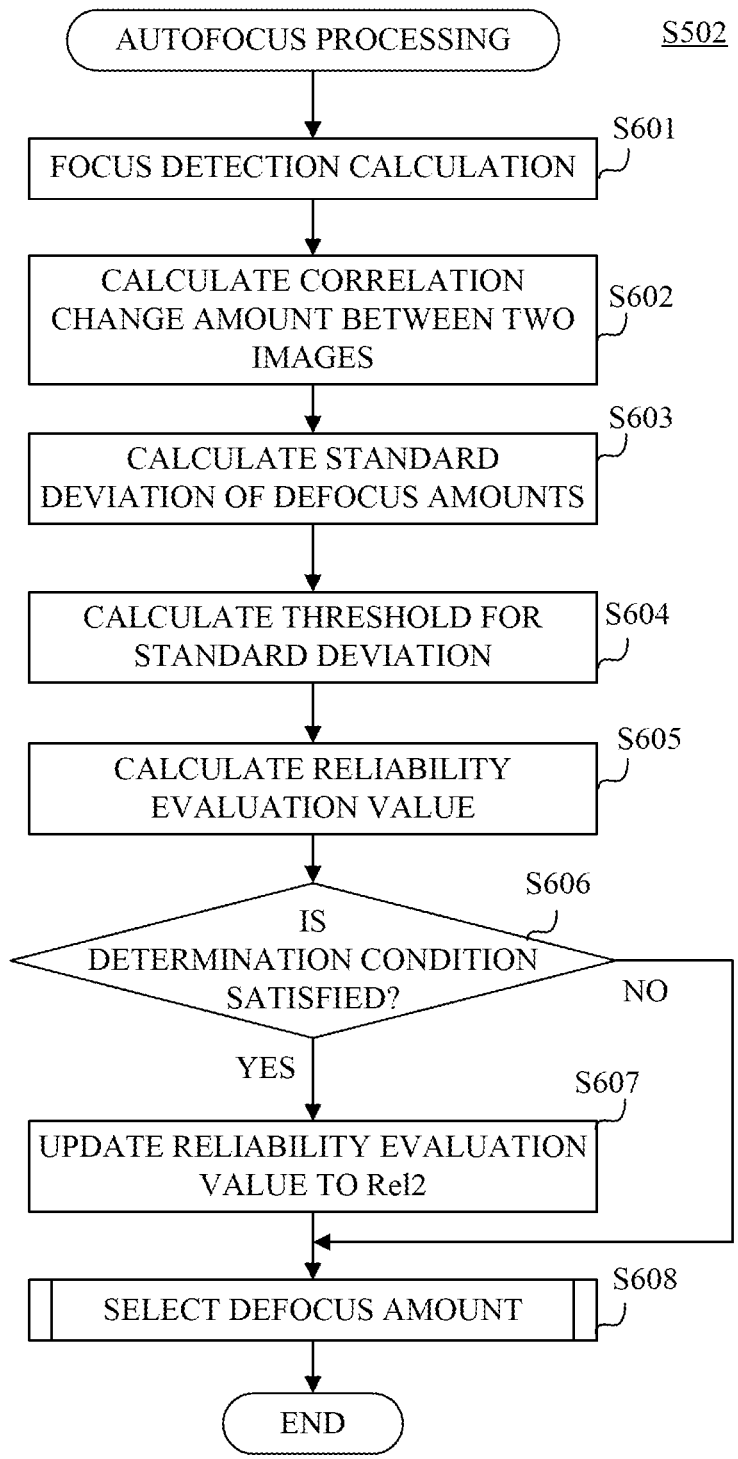
FIG. 6 is a flowchart of autofocus processing according to this embodiment.

Referring now to FIG. 6, a description will be given of the step S502 (autofocus processing) in FIG. 5. FIG. 6 is a flowchart of the autofocus processing. Each step in FIG. 6 is mainly executed by the AF control unit 213b and the AF signal processing unit 204.

Initially, in the step S601, the AF signal processing unit 204 calculates the correlation between the pair of image signals (phase difference signals) acquired from the image sensor 201 based on the instruction from the AF control unit 213b, and calculates a correlation amount (focus detection calculation). Then, the AF control unit 213b calculates a defocus amount based on the image shift amount as a shift amount Shift at which the correlation amount received from the AF signal processing unit 204 has the minimum value. At this time, the AF signal processing unit 204 performs the correlation calculation using three types of filters different in frequency band, such as the low frequency, the medium frequency, and the high frequency band (first, second, and third frequency bands), and the AF control unit 213b calculates three types of defocus amounts for low, medium, and high frequencies. The AF signal processing unit 204 calculates the correlation amount between the pair of image signals (phase difference signals) for each shift amount Shift based on the command from the AF control unit 213b. The AF control unit 213b generates a waveform of the correlation amount for each shift amount Shift received from the AF signal processing unit 204.

Figure 3:
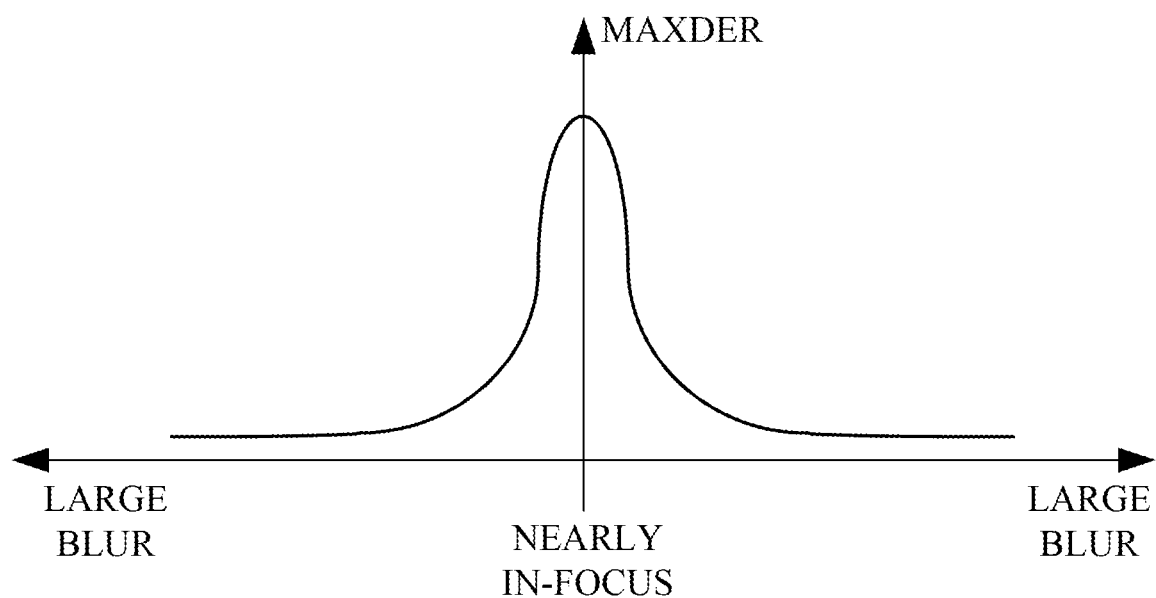
FIG. 3 is an explanatory diagram of an evaluation value regarding a correlation change amount between two images according to this embodiment.

Next, in the step S602, the AF control unit 213b calculates the correlation change amount between the two images. FIG. 3 is an explanatory diagram of an evaluation value regarding the correlation change amount between the two images, and is a graph showing the correlation change amount in driving the focus lens 103 from a large blur state to a nearly in-focus position in the imaging plane phase difference AF. In FIG. 3, the abscissa axis denotes a blur degree of the object, and the ordinate axis indicates a correlation change amount MAXDER. The correlation change amount MAXDER can be calculated by the following expression (1).

$$MAXDER(k)=(COR[k-3]-COR[k-1])-(COR[k-2]-COR[k]) \quad (1)$$

In the expression (1), k denotes an integer variable for specifying the position, and COR[k] denotes a correlation amount between the two images at the position k. At this time, as in the step S601, the AF control unit 213b calculates three types of correlation change amounts MAXDER for low, medium, and high frequencies, which have different filter frequency bands. As illustrated in FIG. 3, in the imaging plane phase difference AF, it is understood that the value of the correlation change amount becomes larger as the lens position approaches to the in-focus point from the large blur state.

Next, in the step S603 in FIG. 6, the AF control unit 213b calculates a standard deviation Def3σ of the defocus amount based on the correlation change amount MAXDER. The standard deviation Def3σ of the defocus amount can be calculated by the following expression (2).

$$Def3\sigma = K \times (A \times MAXDER^B) \quad (2)$$

In the expression (2), K denotes a conversion coefficient for converting the image shift amount into the defocus amount, and A and B are coefficients for the conversion expression used to convert the correlation change amount MAXDER into the standard deviation of the image shift amount. At this time, the AF control unit 213b calculates the standard deviation Def3σ of the three types of defocus amounts by substituting the three types of correlation change amounts MAXDER for low, medium, and high frequencies having different frequency bands, which are calculated in the step S603.

Next, in the step S604, the AF control unit 213b calculates a threshold (standard deviation threshold) of the standard deviation Def3σ of the calculated defocus amount in order to calculate a reliability evaluation value Rel indicating information on the reliability of the defocus amount. This embodiment calculates the threshold of the standard deviation Def3σ based on the luminance condition and the contrast condition.

Figure 8:
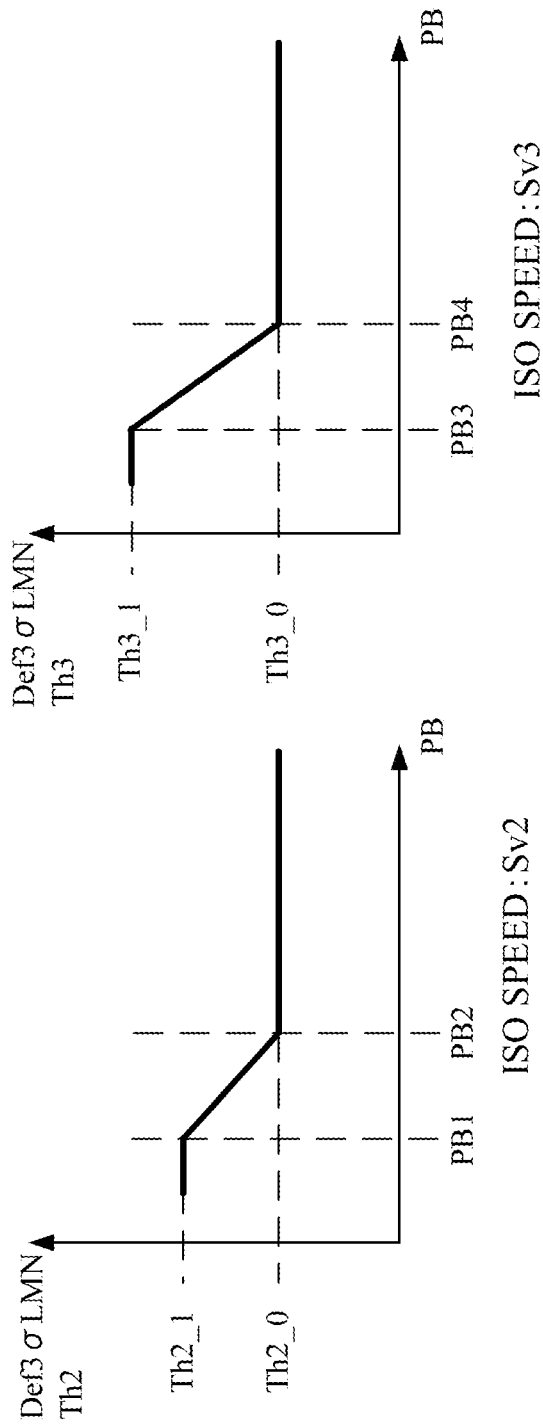
FIGS. 8A and 8B illustrate a relationship between an amplitude and a standard deviation threshold of a defocus amount according to this embodiment.
Figure 11:
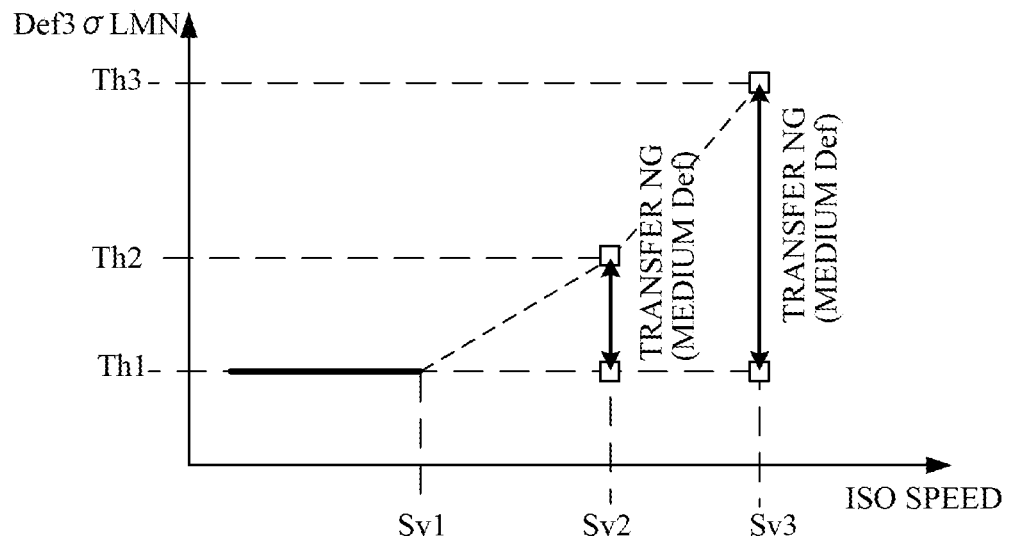
FIG. 11 is a relationship diagram between an ISO speed (imaging sensitivity) and the standard deviation threshold of the defocus amount according to this embodiment.

The AF control unit 213b calculates a standard deviation threshold Def3σLMN of the defocus amount based on the ISO speed in the imaging scene for the luminance condition. FIG. 11 illustrates a relationship between the ISO speed and the standard deviation threshold Def3σLMN of the defocus amount. In FIG. 11, the abscissa axis denotes the ISO speed, and the ordinate axis denotes the standard deviation threshold Def3σLMN. FIGS. 8A and 8B illustrate the relationship between the amplitude and the standard deviation threshold of the defocus amount. FIG. 8A illustrates the relationship in an ISO speed Sv2, and FIG. 8B illustrates the relationship in an ISO speed Sv3 (Sv2<Sv3). In FIGS. 8A and 8B, the abscissa axis denotes the amplitude PB, and the ordinate axis denotes the standard deviation threshold Def3σ.

Since the ISO speed is increased to make proper the exposure as the imaging luminance reduces, there is a correlation between the imaging luminance and the ISO speed. On the other hand, as the ISO speed increases, the noise increases and the standard deviation Def3σ of the defocus amount increases. Thus, as illustrated in FIG. 11, the reliability evaluation value is increased to relax the focusing condition to facilitate the focusing by increasing the standard deviation threshold Def3σLMN. Herein, the standard deviation threshold Def3σLMN of the defocus amount is calculated for the most reliable reliability evaluation value that determines the focusing condition in order to relax the focusing condition. Details of the reliability evaluation value in the ascending order will be described later. As illustrated in FIGS. 8A and 8B, Th2 and Th3 illustrated in FIG. 11 are variably set based on the amplitude PB as a difference between the maximum value and the minimum value of the image signal. The amplitude PB changes in accordance with the object luminance. When the amplitude PB is small, the object luminance is low, so as illustrated in FIGS. 8A and 8B, Th2 and Th3 are respectively increased to relax the focusing condition.

Figure 12:
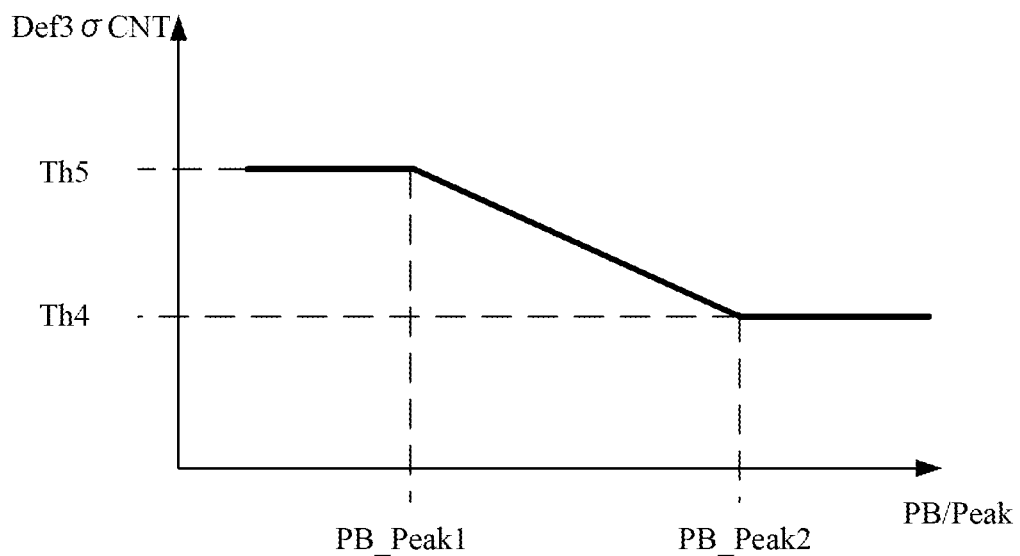
FIG. 12 illustrates a relationship between a contrast evaluation value and the standard deviation threshold of the defocus amount according to this embodiment.

The AF control unit 213b calculates the standard deviation threshold Def3σCNT of the defocus amount based on a contrast evaluation value PB/Peak represented by the amplitude PB to the maximum value Peak of the image signal for the contrast condition. FIG. 12 illustrates a relationship between the contrast evaluation value PB/Peak and the standard deviation threshold Def3σCNT of the defocus amount. In FIG. 12, the abscissa axis denotes the contrast evaluation value PB/Peak, and the ordinate axis denotes the standard deviation threshold Def3σCNT.

As the contrast evaluation value PB/Peak decreases, the contrast of the object decreases. Thus, the AF control unit 213b increases the reliability evaluation value, relaxes the in-focus condition, and facilitates focusing by increasing the standard deviation threshold Def3σCNT. Herein, the standard deviation threshold Def3σCNT of the defocus amount is calculated for the most reliable reliability evaluation value used to determine the focusing condition in order to relax the focusing condition. Then, the AF control unit 213b compares the standard deviation threshold Def3σLMN with the standard deviation threshold Def3σCNT, and sets the larger standard deviation threshold as the standard deviation threshold Def3σTH3 of the defocus amount.

Next, in the step S605 in FIG. 6, the AF control unit 213b calculates a reliability evaluation value Rel that represents the reliability of the calculated defocus amount. The reliability evaluation value Rel is determined in the four stages of a reliability evaluation value Rel3, a reliability evaluation value Rel2, a reliability evaluation value Rel1, and a reliability evaluation value Rel0 in the descending order of reliability, and can be calculated using the following expression (3).

$$Rel=Rel3 \text{ if } (Def3\sigma \leq Def3\sigma TH3)$$

$$Rel2 \text{ if } (Def3\sigma TH3 < Def3\sigma \leq Def3\sigma TH2)$$

$$Rel1 \text{ if } (Def3\sigma TH2 < Def3\sigma \leq Def3\sigma TH1)$$

$$Rel0 \text{ if } (Def3\sigma TH1 \leq Def3\sigma) \quad (3)$$

In the expression (3), Def3σTH3, Def3σTH2, and Def3σTH1 are thresholds (standard deviation threshold) of the standard deviation Def3σ of the defocus amount, respectively. The standard deviation threshold Def3σTH3 is a threshold calculated in the step S604.

When the reliability evaluation value Rel is the reliability evaluation value Rel3, the reliability of the defocus amount is high and the in-focus is available. Thus, in the step S504, the AF control unit 213b performs lens driving based on the defocus amount (defocus driving). When the reliability evaluation value Rel is the reliability evaluation value Rel2, the in-focus is available by frame addition processing of the defocus amount. Thus, in the step S504, the AF control unit 213b performs lens driving based on a value obtained by multiplying the defocus amount by a certain ratio α (<1) (defocus driving).

When the reliability evaluation value Rel is the reliability evaluation value Rel1, it means that the direction of the calculated defocus amount is correct. When the reliability evaluation value Rel is the reliability evaluation value Rel0, it means that the reliability of the defocus amount is the lowest. Thus, when the reliability evaluation value Rel is the reliability evaluation value Rel1 or Rel0, the in-focus is unavailable. Hence, when the reliability evaluation value Rel is the reliability evaluation value Rel1 or Rel0, in the step S504, the AF control unit 213b does not use the defocus amount and drives the lens by a relatively large certain amount (search driving). In other words, at this time, the AF control unit 213b performs the lens driving at a driving speed faster than the lens driving based on the defocus amount.

According to this embodiment, the AF control unit 213b uses the above expression (3) and calculates the reliability (reliability evaluated value) for three types of defocus amounts for low, medium, and high frequencies calculated in the step S601.

Next, in the step S606, the AF control unit 213b determines whether the object that satisfies the predetermined condition and is the focus detection target is a specific object (performs determination processing). According to this embodiment, the AF control unit 213b determines whether or not the specific object such as a thin line or a low-contrast object, is being captured at a low luminance (when the predetermined condition is satisfied).

Figure 4:
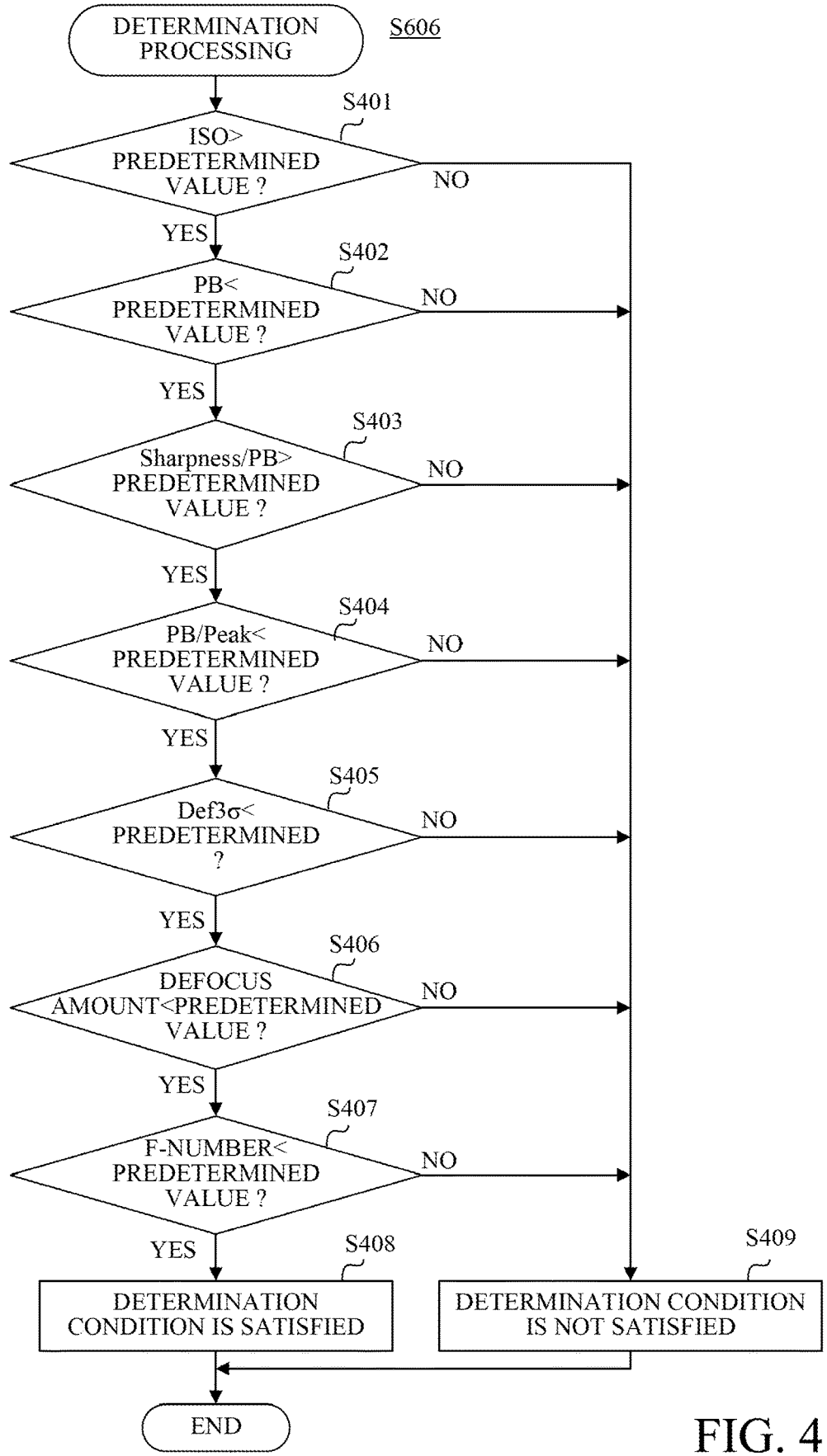
FIG. 4 is a flowchart of determination processing according to this embodiment.

Referring now to FIG. 4, a description will be given of the determination processing. FIG. 4 is a flowchart of the determination processing. Each step in FIG. 4 is mainly executed by the AF control unit 213b.

Initially, in the step S401, the AF control unit 213b determines whether the ISO speed is larger than a predetermined value (predetermined ISO speed). If the ISO speed is larger than the predetermined value, the flow proceeds to the step S402. On the other hand, if the ISO speed is less than the predetermined value, the flow proceeds to the step S409.

In the step S402, the AF control unit 213b determines whether the amplitude PB is smaller than a predetermined value (predetermined amplitude). If the amplitude PB is smaller than the predetermined value, the flow proceeds to the step S403. On the other hand, if the amplitude PB is equal to or larger than the predetermined value, the flow proceeds to the step S409. This embodiment uses the amplitude PB of the image signal for the luminance evaluation value, but the present invention is not limited to this embodiment. The luminance evaluation value may include at least one of the amplitude, the maximum value, and the minimum value of the image signal, and the object luminance.

Next, in the step S403, the AF control unit 213b determines whether the sharpness evaluation value Sharpness/PB obtained by dividing the image sharpness Sharpness by the amplitude PB is larger than a predetermined value (predetermined sharpness evaluation value). If the sharpness evaluation value Sharpness/PB is larger than a predetermined value, the flow proceeds to the step S404. On the other hand, if the sharpness evaluation value Sharpness/PB is less than the predetermined value, the flow proceeds to the step S409. The sharpness of the image can be calculated using the following equation (4).

$$\text{Sharpness} = \Sigma(S[k+1]-S[k])^2 / \Sigma(S[k+1]-S[k]) \quad (4)$$

In the expression (4), k denotes a position (integer variable for specifying a position), and S[k] denotes a signal value (luminance value) of an image signal (phase difference image signal) at the position k.

Next, in the step S404, the AF control unit 213b determines whether the contrast evaluation value PB/Peak is smaller than a predetermined value (predetermined contrast evaluation value). If the contrast evaluation value PB/Peak is smaller than the predetermined value, the flow proceeds to the step S405. On the other hand, when the contrast evaluation value PB/Peak is equal to or more than the predetermined value, the flow proceeds to the step S409.

Next, in the step S405, the AF control unit 213b determines whether the standard deviation Def3σ in the low-frequency defocus amount calculated in the step S601 is smaller than a predetermined value (predetermined standard deviation). If the standard deviation Def3σ is smaller than the predetermined value, the flow proceeds to step S406. On the other hand, if the standard deviation Def3σ is equal to or larger than the predetermined value, the flow proceeds to step S409.

Next, in the step S406, the AF control unit 213b determines whether the low-frequency defocus amount calculated in the step S601 is smaller than a predetermined value (predetermined defocus amount). If the defocus amount is smaller than the predetermined value, the flow proceeds to the step S407. On the other hand, if the defocus amount is equal to or more than the predetermined value, the flow proceeds to the step S409.

Next, in the step S407, the AF control unit 213b determines whether the F-number (imaging aperture value) is smaller than a predetermined value (predetermined F-number). If the F-number is smaller than the predetermined value, the flow proceeds to the step S408. On the other hand, if the F-number is larger than or equal to the predetermined value, the flow proceeds to the step S409.

In the step S408, the AF control unit 213b determines that the current state is a state for capturing the specific object such as the thin line or a low contrast object in the low luminance state (when the predetermined condition is satisfied), and this flow ends. In the step S409, the AF control unit 213b determines that the current state is not the state for capturing the specific object such as the thin line or low contrast object in the low luminance state (when the predetermined condition is satisfied).

Next, in the step S607 in FIG. 6, the AF control unit 213b updates the reliability evaluation values Rel1 and Rel0 to the defocus amount calculated in the step S605 to the reliability evaluation value Rel2. Due to this processing, the AF control unit 213b performs the lens driving based on the defocus amount in the lens driving control in the step S504, and thus the lens driving amount and the lens driving speed can be reduced. As a result, since the focus lens 103 is easily stopped, the in-focus rate can be increased for the specific object such as the thin line or low contrast object. At this time, the AF control unit 213b may control the luminance of the image signal output from inside the focus detection frame in the image sensor 201 in starting the focus detection (set to an appropriate luminance).

Next, in the step S608, the AF control unit 213*b* selects one defocus amount based on the three types of defocus amounts for low, medium, and high frequencies calculated in the step S601 and the reliability evaluation calculated in the step S605 or S607, and ends this flow. Thereafter, assume that a defocus amount calculated through a filter for the low frequency will be referred to as a lame Def, a defocus amount calculated through a filter for the medium frequency is referred to as a medium Def, and a defocus amount calculated through a filter for a high frequency will be referred to as a small Def.

Figure 7:
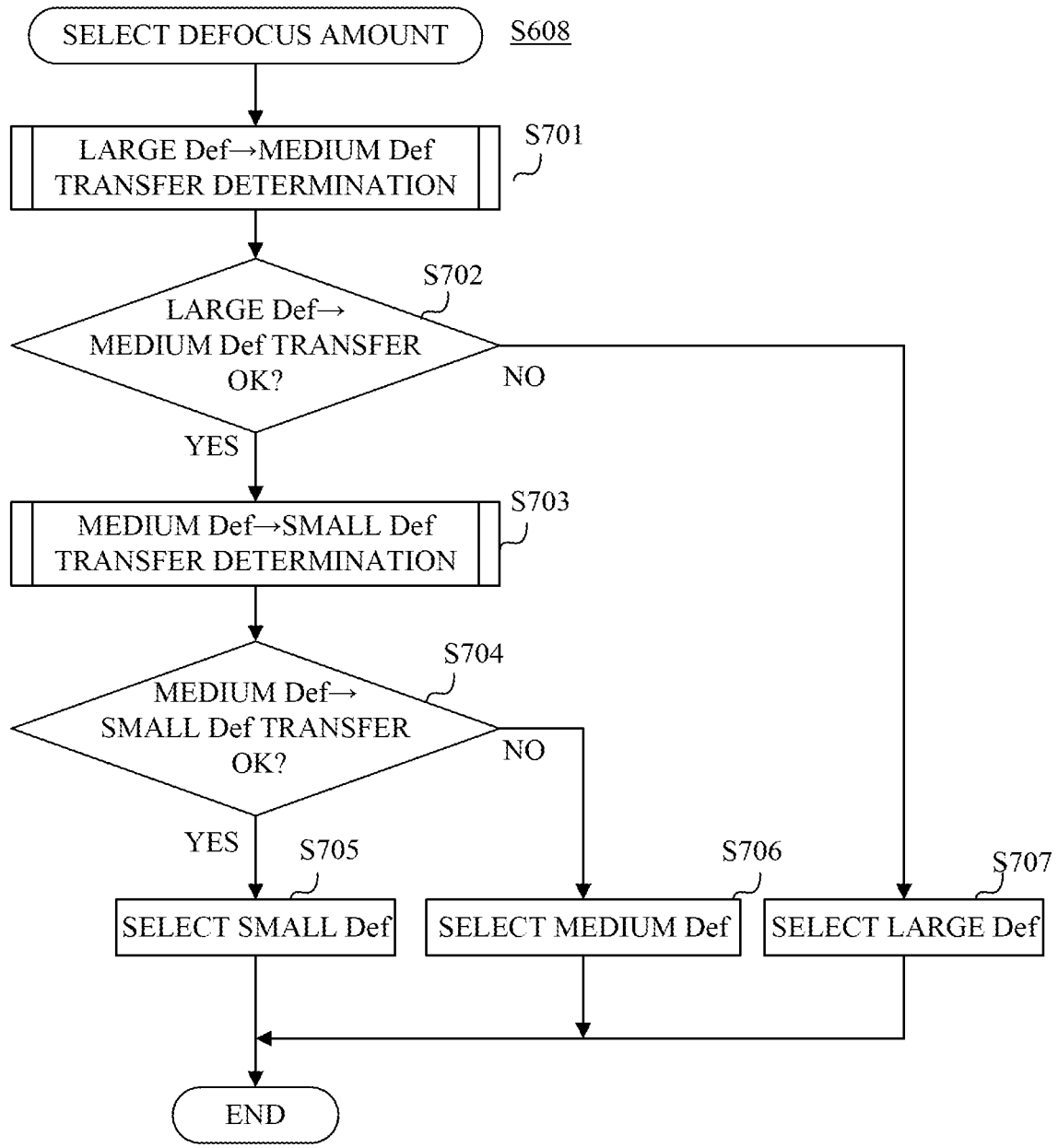
FIG. 7 is a flowchart of a method of selecting a defocus amount according to this embodiment.

Referring now to FIG. 7, a description will be given of a method of selecting the defocus amount (step S608 in FIG. 6). FIG. 7 is a flowchart of a method of selecting the defocus amount. Each step in FIG. 7 is mainly executed by the AF control unit 213*b*.

Initially, in the step S701, the AF control unit 213*b* performs a transfer determination from a large Def (first defocus amount) to a medium Def (second defocus amount), as described later. Next, in the step S702, the AF control unit 213*b* determines whether or not the transfer is available from the large Def to the medium Def. If the transfer is available from the large Def to the medium Def, the flow proceeds to the step S703. On the other hand, if the transfer is unavailable from the large Def to medium Def, the flow proceeds to the step S707.

In the step S703, the AF control unit 213*b* performs the transfer determination from the medium Def (second defocus amount) to the small Def (third defocus amount), as described later. Next, in the step S704, the AF control unit 213*b* determines whether or not the transfer is available from the medium Def to the small Def. If the transfer is available from the medium Def to the small Def, the flow proceeds to the step S705. On the other hand, if the transfer is unavailable from the medium Def to the small Def, the flow proceeds to the step S706.

In the step S705, the AF control unit 213*b* selects the small Def as the defocus amount used to drive the focus lens 103 (focus control), and ends this flow. In the step S706, the AF control unit 213*b* selects the medium Def as the defocus amount used for the focus control, and ends this flow. In the step S707, the AF control unit 213*b* selects the large Def as the defocus amount used for the focus control, and ends this flow.

Figure 9:
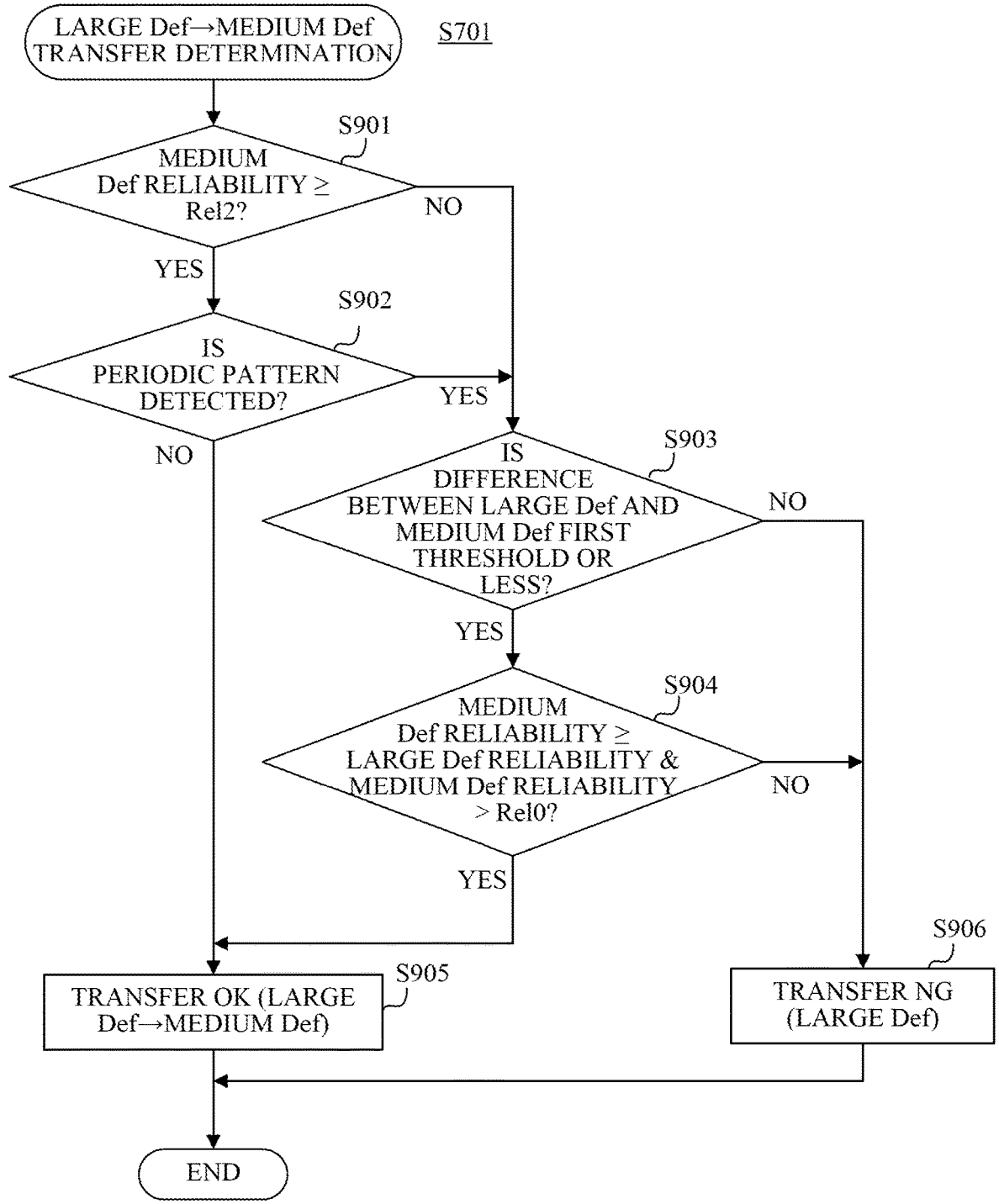
FIG. 9 is a flowchart of a transfer determination from a large Def to a medium Def according to this embodiment.

Referring now to FIG. 9, a description will be given of transfer determination from the large Def to the medium Def (step S701 in FIG. 7). Each step in FIG. 9 is mainly executed by the camera control unit 212 (AF control unit 213*b*).

Initially, in the step S901, the AF control unit 213*b* determines whether the reliability (reliability evaluation value) of the medium Def is equal to or higher than the reliability evaluation value Rel2. The determination in the step S901 can increase the likelihood to transfer to the medium Def even for the low contrast object and increase the in-focus rate. If the reliability of the medium Def is equal to or higher than the reliability evaluation value Rel2, the flow proceeds to the step S902. On the other hand, if the reliability of the medium Def is lower than the reliability evaluation value Rel2, the flow proceeds to the step S903.

In the step S902, the camera control unit 212 determines whether an object having a periodic pattern has been detected. The object having the periodic pattern has a low reliability of the defocus amount. Thus, when the object having the periodic pattern is detected, the transfer is prohibited from the large Def to the medium Def. A waveform indicating the correlation amount of the object having the periodic pattern has a periodic pattern where the correlation amount as the in-focus point candidate becomes minimum Thus, the determination method at this time, for example, calculates the correlation change amount between two images for each in-focus candidate, and compares the calculated difference between the correlation change amounts between the two images with a threshold. If the object having the periodic pattern is detected, the flow proceeds to the step S903. On the other hand, if the object having the periodic pattern is not detected, the flow proceeds to the step S905.

In the step S903, the AF control unit 213*b* determines whether or not the difference between the defocus amounts of the large Def and the medium Def is equal to or less than a preset first depth threshold (first threshold). If the difference between the defocus amounts of the large Def and the medium Def is equal to or less than the first depth threshold, the flow proceeds to the step S904. On the other hand, if the difference is larger than the first depth threshold, the flow proceeds to the step S906. The first depth threshold is set, for example, to be nine times as long as the depth of focus so that the large Def can be properly transferred to the medium Def. Setting the first depth threshold using the focal depth as a reference (longer than the focal depth) can set a uniform threshold even if the F-number or the focus detection area changes.

In the step S904, the AF control unit 213*b* determines whether the reliability of the medium Def (second reliability) is equal to or higher than the reliability of the large Def (first reliability), and whether or not the reliability of the medium Def is higher than the reliability evaluation value Rel0. If both of these conditions are met, the flow proceeds to the step S905. On the other hand, if at least one of the conditions is not satisfied, the flow proceeds to the step S906.

In the step S905, the AF control unit 213*b* determines that the transfer is available from the large Def to the medium Def, and ends this flow. On the other hand, in the step S906, the AF control unit 213*b* determines that transfer is unavailable from the large Def to the medium Def, and ends this flow. Thereby, in the process of moving the focus lens 103 from the large blur state to the small blur state, whether the transfer is available from the large Def to the medium Def can be determined based on the difference between the defocus amounts of the large Def and the medium Def and the respective reliabilities.

Figure 10:
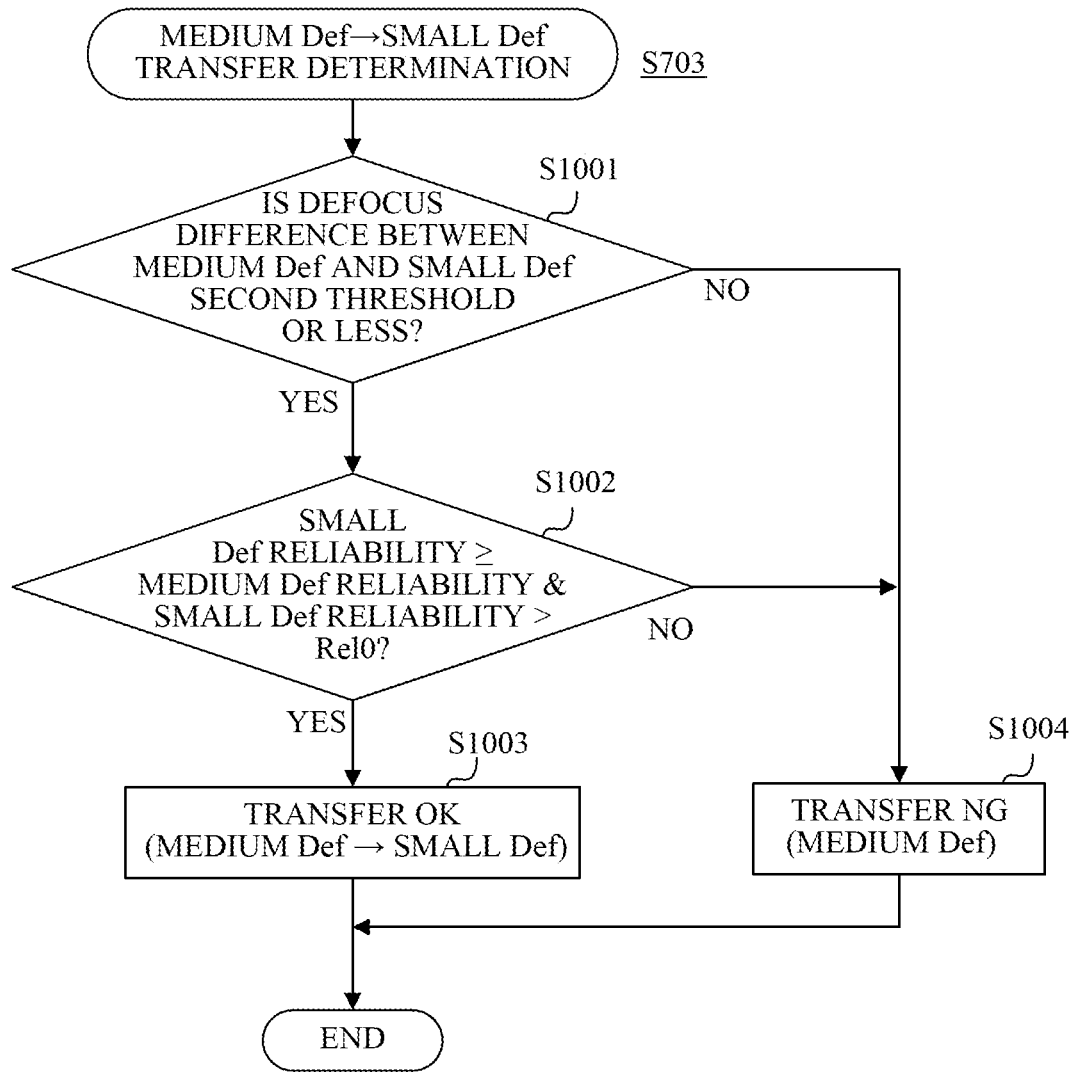
FIG. 10 is a flowchart of a transfer determination from a medium Def to a small Def according to this embodiment.

Referring now to FIG. 10, a description will be given of the transfer determination from the medium Def to the small Def (step S703 in FIG. 7). Each step in FIG. 10 is mainly executed by the AF control unit 213*b*.

Initially, in the step S1001, the AF control unit 213*b* determines whether or not the difference between the defocus amounts of the medium Def and the small Def is equal to or less than a preset second depth threshold (second threshold). If the difference between the defocus amounts of the medium Def and the small Def is equal to or less than a second depth threshold, the flow proceeds to the step S1002. On the other hand, if the difference is larger than the second depth threshold, the flow proceeds to the step S1004. The second depth threshold is set, for example, to be three times as long as the depth of focus so that the medium Def can be properly transferred to the small Def. Setting the second depth threshold with the focal depth as a reference (making it larger than the focal depth) can set a uniform threshold even if the F-number or the focus detection area changes. The second depth threshold is set to a value smaller than the first depth threshold used in the determination of the step S903 in FIG. 9. This is because as the defocus amount changes in order of the small Def, the medium Def, and the large Def, the detection of the defocus amount increasingly scatters and consequently a difference between the medium Def and the large Def becomes larger than a difference between small Def and medium Def.

When the condition in the step S606 is satisfied, this embodiment may increase the second depth threshold to facilitate the transfer from the medium Def to the small Def in order to increase the in-focus rate. In other words, when the condition in the step S606 is not satisfied, the AF control unit 213b sets the focus lens 103 based on the medium Def when the first condition is satisfied (when the defocus difference between the medium Def and the small Def is equal to or less than the second threshold). On the other hand, when the condition in the step S606 is satisfied and the second condition more relaxed than the first condition is satisfied (when the defocus difference is equal to or less than the third threshold larger than the second threshold), the AF control unit 213b controls the focus lens based on the medium Def.

In the step S1002, the AF control unit 213b determines whether the reliability (reliability evaluation value) of the small Def is equal to or higher than the reliability of the medium Def, and whether the reliability of the small Def is higher than the reliability evaluation value Rel0. If both of these conditions are satisfied, the flow proceeds to the step S1003. On the other hand, when at least one condition is not satisfied, the flow proceeds to the step S1004.

In the step S1003, the AF control unit 213b determines that the medium Def can be transferred to the small Def, and ends this flow. On the other hand, in the step S1004, the AF control unit 213b determines that the transfer is unavailable from the medium Def to the small Def, and ends this flow. Thereby, in the process of moving the focus lens 103 from the small blur state to the in-focus position, whether the medium Def can be transferred to the small Def can be determined based on the difference between the defocus amounts of the medium Def and the small Def and the respective reliabilities.

Hence, according to this embodiment, the control apparatus (the camera control unit 212 or the AF signal processing unit 204) includes a calculation unit (the focus detection unit 213a) and a focus control unit (the AF control unit 213b). The calculation unit performs a focus detection by the phase difference detection method based on the image signal output from the image sensor 201, and calculates the defocus amount (focus detection information). The focus control unit controls the focus lens 103 based on the defocus amount. The focus control unit changes the driving speed of the focus lens based on the information on the luminance or contrast of the image signal.

When determining that the specific object (a thin line, a low contrast object, or the like) is being captured based on the information, the focus control unit may reduce the driving speed of the focus lens. The information may include a luminance evaluation value of the image signal (S402). The luminance evaluation value may include at least one of the amplitude, the maximum value, the minimum value of the image signal, or the object luminance. The information may include a contrast evaluation value (obtained by normalizing the amplitude with the maximum value of the image signal) of the image signal (S404). The information may include a sharpness evaluation value of the image signal (S403).

When the predetermined condition is satisfied, the focus control unit may change the driving speed of the focus lens based on the information (S401, S405 to S407). The predetermined condition may include the condition relating to the defocus amount (S405, S406). The predetermined condition may include a condition relating to the ISO speed (S401). The predetermined condition may include a condition relating to the aperture value (F-number) (S407).

The calculation unit may calculate a reliability evaluation value of the defocus amount. When determining that the predetermined condition is satisfied and the specific object is being captured, the focus control unit may increase the reliability evaluation value (S607). The calculation unit may calculate the reliability evaluation value based on the standard deviation of the defocus amount (S604, S605). The focus control unit may drive the focus lens at the first driving speed regardless of the defocus amount when determining that the predetermined condition is not satisfied or the specific object is not being captured (S504: search driving). On the other hand, when determining that the predetermined condition is satisfied and the specific object is being captured, the focus control unit drives the focus lens at a second driving speed lower than the first driving speed based on the defocus amount (S504: defocus driving).

When determining that the predetermined condition is satisfied and that the specific object is being captured, the focus control unit may control the luminance of the image signal (to set to an appropriate luminance) output from the inside of the focus detection frame in the image sensor in starting the focus detection (AF and AE processing).

The calculation unit may calculate a first defocus amount (medium Def) based on the image signal after filtering using a first filter that allows the image signal in a first frequency band to pass through the first filter. The calculation unit may calculate a second defocus amount (small Def) after filtering using a second filter that allows the image signal in a second frequency band higher than the first frequency band to pass through the second filter. The focus control unit drives the focus lens based on the second defocus amount when determining that the predetermined condition is not satisfied or the specific object is not being captured, and when the first condition is satisfied (when the defocus difference between the medium Def and the small Def is equal to or less than the second threshold). The focus control unit may control the focus lens based on the second defocus amount when determining that the predetermined condition is satisfied and the specific object is being captured, and when the second threshold more relaxed than the first condition is satisfied (when the defocus difference is larger than the second threshold and equal to or smaller than the third threshold).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-117237, filed on Jun. 20, 2018, which is hereby incorporated by reference herein in its entirety.

What is claimed is:

1. A control apparatus comprising:
a calculation unit configured to perform a focus detection by a phase difference detection method based on an image signal output from an image sensor, and to calculate a defocus amount; and
a focus control unit configured to control a focus lens based on the defocus amount,
wherein when a predetermined condition is satisfied, the focus control unit changes a driving speed of the focus lens based on information on a luminance or contrast of the image signal,
wherein at least one processor or circuit is configured to perform a function of at least one of the units, and
wherein the focus control unit drives the focus lens at a first driving speed regardless of the defocus amount when determining that the predetermined condition is not satisfied or that a specific object is not being captured based on the information, and drives the focus lens at a second driving speed lower than the first driving speed based on the defocus amount when determining that the predetermined condition is satisfied and that the specific object is being captured.

2. The control apparatus according to claim 1, wherein the predetermined condition includes a condition relating to the defocus amount.

3. The control apparatus according to claim 1, wherein the predetermined condition includes a condition relating to an ISO speed.

4. The control apparatus according to claim 1, wherein the predetermined condition includes a condition relating to an F-number.

5. The control apparatus according to claim 1, wherein the calculation unit calculates a reliability evaluation value of the defocus amount, and
wherein the focus control unit increases the reliability evaluation value when determining that the predetermined condition is satisfied and that the specific object is being captured based on the information.

6. The control apparatus according to claim 5, wherein the calculation unit calculates the reliability evaluation value based on a standard deviation of the defocus amount.

7. The control apparatus according to claim 1, wherein the focus control unit controls a luminance of the image signal output from an inside of a focus detection frame in the image sensor in starting the focus detection when determining that the predetermined condition is satisfied and that the specific object is being captured based on the information.

8. The control apparatus according to claim 1, wherein the calculation unit calculates a first defocus amount based on the image signal after filtering using a first filter that allows the image signal in a first frequency band to pass through the first filter, and
wherein the calculation unit calculates a second defocus amount based on the image signal after the filtering using a second filter that allows the image signal in a second frequency band higher than the first frequency band to pass through the second filter,
wherein the focus control unit drives the focus lens based on the second defocus amount when a first condition is satisfied and when the focus control unit determines that the predetermined condition is not satisfied or the specific object is not being captured based on the information, and
wherein the focus control unit drives the focus lens based on the second defocus amount when a second condition more relaxed than the first condition is satisfied and when the focus control unit determines that the predetermined condition is satisfied and the specific object is being captured.

9. An imaging apparatus comprising:
a control apparatus; and
an image sensor configured to photoelectrically converting an optical image formed through an imaging optical system,
wherein the control apparatus includes:
a calculation unit configured to perform a focus detection by a phase difference detection method based on an image signal output from an image sensor, and to calculate a defocus amount; and
a focus control unit configured to control a focus lens based on the defocus amount,
wherein when a predetermined condition is satisfied, the focus control unit changes a driving speed of the focus lens based on information on a luminance or contrast of the image signal,
wherein at least one processor or circuit is configured to perform a function of at least one of the units, and
wherein the focus control unit drives the focus lens at a first driving speed regardless of the defocus amount when determining that the predetermined condition is not satisfied or that a specific object is not being captured based on the information, and drives the focus lens at a second driving speed lower than the first driving speed based on the defocus amount when determining that the predetermined condition is satisfied and that the specific object is being captured.

10. An imaging apparatus according to claim 9, wherein the image sensor includes a plurality of photoelectric conversion units for each of two-dimensionally arranged micro lenses.

11. A control method comprising:
performing a focus detection by a phase difference detection method based on an image signal output from an image sensor, and calculating a defocus amount; and
controlling a focus lens based on the defocus amount,
wherein when a predetermined condition is satisfied, the controlling changes a driving speed of the focus lens based on information on a luminance or contrast of the image signal, and
wherein the controlling drives the focus lens at a first driving speed regardless of the defocus amount when determining that the predetermined condition is not satisfied or that a specific object is not being captured based on the information, and drives the focus lens at a second driving speed lower than the first driving speed based on the defocus amount when determining that the predetermined condition is satisfied and that the specific object is being captured.

12. A non-transitory computer-readable storage medium storing a program for causing a computer to execute a control method, wherein the control method comprises:

performing a focus detection by a phase difference detection method based on an image signal output from an image sensor, and calculating a defocus amount; and controlling a focus lens based on the defocus amount, wherein when a predetermined condition is satisfied, the controlling changes a driving speed of the focus lens based on information on a luminance or contrast of the image signal, and wherein the controlling drives the focus lens at a first driving speed regardless of the defocus amount when determining that the predetermined condition is not satisfied or that a specific object is not being captured based on the information, and drives the focus lens at a second driving speed lower than the first driving speed based on the defocus amount when determining that the predetermined condition is satisfied and that the specific object is being captured.

* * * * *